US012763389B2

(12) United States Patent
Yoshito

(10) Patent No.: US 12,763,389 B2
(45) Date of Patent: Oct. 13, 2026

(54) SENSOR UNIT AND SENSOR UNIT-EQUIPPED BATTERY WIRING MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Daiji Yoshito, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 511 days.

(21) Appl. No.: 18/559,373

(22) PCT Filed: Feb. 11, 2022

(86) PCT No.: PCT/JP2022/005524
§ 371 (c)(1),
(2) Date: Nov. 7, 2023

(87) PCT Pub. No.: WO2022/249574
PCT Pub. Date: Dec. 1, 2022

(65) Prior Publication Data

US 2024/0274904 A1 Aug. 15, 2024

(30) Foreign Application Priority Data

May 26, 2021 (JP) ................................ 2021-088579

(51) Int. Cl.
*H01M 10/48* (2006.01)
*H01M 10/42* (2006.01)
*H01M 50/503* (2021.01)

(52) U.S. Cl.
CPC ....... *H01M 10/482* (2013.01); *H01M 10/425* (2013.01); *H01M 50/503* (2021.01)

(58) Field of Classification Search
CPC . H01M 10/425; H01M 10/482; H01M 50/503
See application file for complete search history.

(56) References Cited

U.S. PATENT DOCUMENTS 8,962,168 B2 2/2015 Suga
2016/0322624 A1 11/2016 Ichikawa et al.
2020/0333192 A1 10/2020 Takase et al.

FOREIGN PATENT DOCUMENTS

JP 2014-093163 5/2014
JP 2019-074327 5/2019
(Continued)

OTHER PUBLICATIONS

International Search Report issued in WIPO Patent Application No. PCT/JP2022/005524, dated May 10, 2022, along with an English translation thereof.

*Primary Examiner* — Sarah A. Slifka
(74) *Attorney, Agent, or Firm* — Greenblum & Bernstein, P.L.C.

(57) ABSTRACT

A sensor unit includes: a band-shaped and flexible conductive path structure including a laminated conductor and an insulating film that covers the conductor; a sensor element that is arranged on a surface of the conductive path structure and is connected to the conductor; and a plate material that is arranged on a rear surface of the conductive path structure, and has one surface fixed to a position of the conductive path structure that is opposite to the sensor element in a thickness direction of the conductive path structure, wherein another (Continued)

surface of the plate material serves as a contact surface for contacting a detection target, and the plate material has a shape obtained by folding one planar metal plate in a plate thickness direction in half, so that a portion in which a burr is formed of the planar metal plate is arranged on an inner side in the folding direction.

7 Claims, 9 Drawing Sheets

(56) References Cited

FOREIGN PATENT DOCUMENTS

| | | |
|---|---|---|
| JP | 2020-187137 | 11/2020 |
| WO | 2012/137289 | 10/2012 |
| WO | 2015/122496 | 8/2015 |

SENSOR UNIT AND SENSOR UNIT-EQUIPPED BATTERY WIRING MODULE

TECHNICAL FIELD

The present disclosure relates to a sensor unit and a sensor unit-equipped battery wiring module.

BACKGROUND ART

Patent Document 1 discloses a sensor unit to be attached to a detection target. In the sensor unit, a sensor element is connected to a surface of a band-shaped and flexible conductive path structure, and one face of a metal plate material is fixed to a rear surface of the portion of the conductive path structure to which the sensor element is attached. The sensor unit includes a biasing member that biases the plate material toward the detection target, and due to elastic recovery of the biasing member, the other face of the plate material is pressed against the detection target and held while being in contact therewith. In this structure, since the other face of the metal plate material serves as a contact surface for contacting the detection target, it is possible to reliably bring the contact surface into contact with the detection target, realizing stabilization of detection accuracy of the sensor element. Particularly, if the sensor element is a temperature sensor, the heat of the detection target is rapidly transmitted to the metal plate material with excellent thermal conductivity, and the temperature of the detection target can be detected with more accuracy.

CITATION LIST

Patent Document

Patent Document 1: JP 2020-187137A

SUMMARY OF INVENTION

Technical Problem

However, a metal plate material is obtained by cutting a planar metal plate into a predetermined size using a press-punching process. Therefore, a burr may be formed on a cut surface (side surface) of the metal plate material at an end in a shear direction. If the surface of the plate material on which the burr is formed (at an end of the cut surface in the shear direction) is brought into contact with the rear surface of the conductive path structure, the conductive path structure may be broken. Also, if the surface of the plate material on which the burr is formed is brought into contact with a detection target, a gap or backlash may be created between the detection target and the plate material due to the burr to reduce the detection accuracy of the sensor element. Therefore, a deburring process needs to be additionally performed on the metal plate material, and thus complication of manufacturing and increase in cost are unavoidable.

Therefore, disclosed are a sensor unit and a sensor unit-equipped battery wiring module that can suppress a breakage of a conductive path structure and a reduction in detection accuracy, while simplifying the manufacturing process and suppressing the manufacturing cost.

Solution to Problem

A sensor unit according to the present disclosure is a sensor unit includes: a band-shaped and flexible conductive path structure including a laminated conductor and an insulating film that covers the conductor; a sensor element that is arranged on a surface of the conductive path structure and is connected to the conductor; and a plate material that is arranged on a rear surface of the conductive path structure, and has one surface fixed to a position of the conductive path structure that is opposite to the sensor element in a thickness direction of the conductive path structure, wherein another surface of the plate material serves as a contact surface for contacting a detection target, and the plate material has a shape obtained by folding one planar metal plate in a plate thickness direction in half, so that a portion of the planar metal plate in which a burr is formed is arranged on an inner side in the folding direction.

A sensor unit-equipped battery wiring module according to the present disclosure is a sensor unit-equipped battery wiring module configured to be mounted on a battery cell group in which a plurality of battery cells are lined up, the sensor unit-equipped battery wiring module including: a plurality of busbars electrically connected to the battery cell group; an insulating case in which the plurality of busbars are received; and a cover part that is mounted on the case and covers the plurality of busbars, wherein the sensor unit according to the present disclosure is used as a sensor unit, the case includes a sensor unit arrangement region that is arranged on at least one battery cell that is a detection target, and in the sensor unit arrangement region, the sensor unit is arranged in a state in which the plate material is accessible to the battery cell.

Advantageous Effects of Invention

According to the sensor unit and the sensor unit-equipped battery wiring module, it is possible to suppress a breakage of a conductive path structure and a reduction in detection accuracy, while simplifying the manufacturing process and suppressing the manufacturing cost.

DESCRIPTION OF EMBODIMENTS

Description of Embodiments of Present Disclosure

Figure 1:
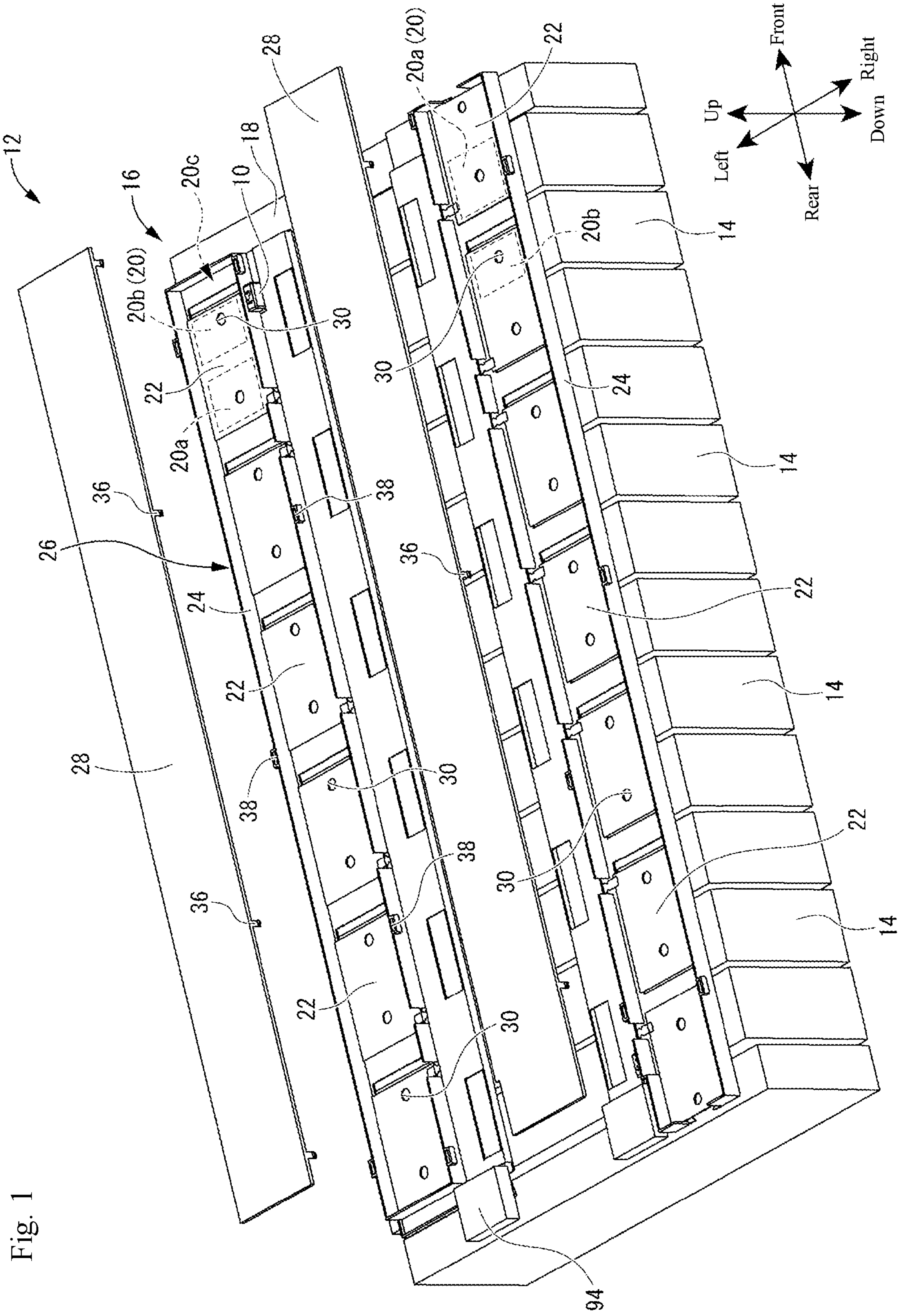
FIG. 1 is a perspective view illustrating the entire sensor unit-equipped battery wiring module according to Embodiment 1 attached to a battery cell group.
Figure 2:
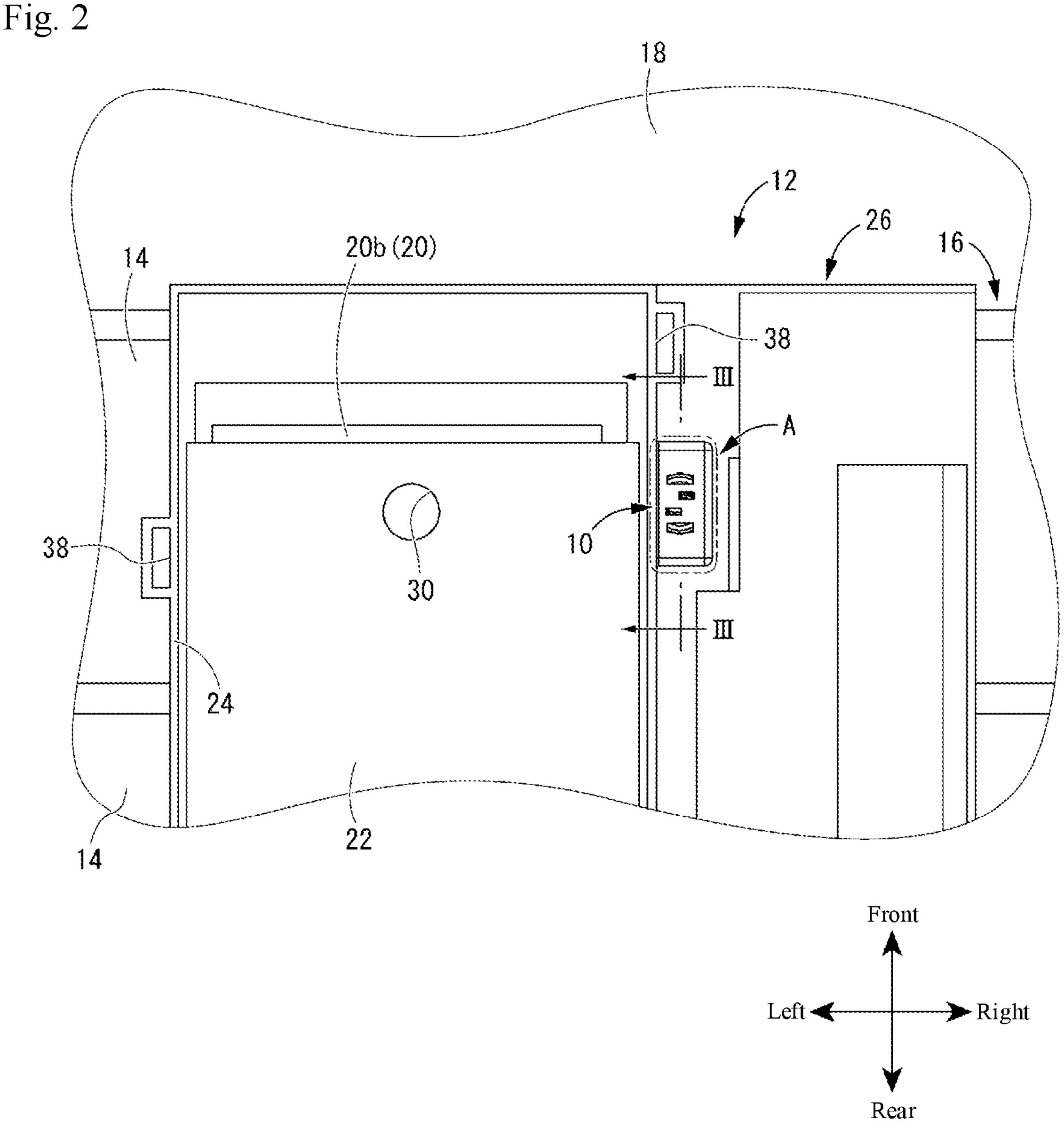
FIG. 2 is an enlarged plan view illustrating a main part of the sensor unit-equipped battery wiring module shown in FIG. 1 (except for a cover part).

First, modes for carrying out the present disclosure will be listed and described.

A sensor unit according to the present disclosure is (1) a sensor unit including: a band-shaped and flexible conductive path structure including a laminated conductor and an insulating film that covers the conductor; a sensor element that is arranged on a surface of the conductive path structure and is connected to the conductor; and a plate material that is arranged on a rear surface of the conductive path structure, and has one surface fixed to a position of the conductive path structure that is opposite to the sensor element in a thickness direction of the conductive path structure, wherein another surface of the plate material serves as a contact surface for contacting a detection target, and the plate material has a shape obtained by folding one planar metal plate in a plate thickness direction in half, so that a portion of the planar metal plate in which a burr is formed is arranged on an inner side in the folding direction.

According to this configuration, the metal plate material fixed to the rear surface of the conductive path structure has the shape obtained by folding one planar metal plate in the plate thickness direction in half, so that a portion of the planar metal plate in which a burr is formed is arranged on the inner side in the folding direction. That is to say a burr may be formed on a cut surface (side surface) of a single metal plate material at an end in the shear direction. The inventors of the present invention focused on the fact that a portion in which a burr is formed is limited to one end of a cut surface (side surface) of a plate material, and arrived at employing a plate material having a shape obtained by folding a single planar metal plate in a plate thickness direction in half, so that a portion in which a burr is formed is arranged on the inner side in the folding direction, thereby having accomplished the structure of the present disclosure. Employing such a plate material avoids situations that, even if a burr is formed on the plate material, the burr is arranged on one surface side on which the plate material is fixed to the rear surface of the conductive path structure, or on the other surface (contact surface) side on which the plate material comes into contact with a detection target, since the burr is arranged on the inner side in the folding direction. As a result, even if the metal plate material is employed, likelihoods that a burr comes into contact with the conductive path structure to break the conductive path structure, or a gap or backlash is created between the detection target and the plate material due to a burr to reduce the detection accuracy of the sensor element. Moreover, since a deburring process, which was needed for a conventional plate material, is no longer required, it is possible to simplify the manufacturing process and reduce the manufacturing cost.

(2) Preferably the plate material has a first planar plate portion and a second planar plate portion that are overlapped with each other in the folding direction, and a gap between overlapped surfaces of the first planar plate portion and the second planar plate portion is filled with a thermally conductive resin. In the plate material, the gap between the overlapped surfaces of the first planar plate portion and the second planar plate portion overlapped with each other in the folding direction is filled with the thermally conductive resin. With this, even if a gap is created between the first planar plate portion and the second planar plate portion, it is possible to suppress a reduction in heat conductivity between the first planar plate portion and the second planar plate portion via the thermal conductive resin whose thermal conductivity is greater than that of an air layer.

(3) Preferably, the sensor unit further includes: a biasing member configured to bias the plate material toward the detection target. Since the plate material is biased toward the detection target by the biasing member, it is possible to hold the contact surface of the plate material in a state in which it is reliably in contact with the detection target, and reliably maintain the detection accuracy of the sensor element.

(4) Preferably the sensor unit further includes: an upper housing that is arranged on the surface of the conductive path structure, and has a shape of a bottomed tube that is open to the surface; and a lower housing that is tubular, and is mounted inside the upper housing so as to be displaceable in an axial direction of the upper housing, wherein a portion of the lower housing on a lower end side in its axial direction surrounds the sensor element and is fixed to the surface of the conductive path structure, so as to configure a sensor element accommodation part, and a portion of the lower housing on an upper end side in the axial direction configures a biasing member holding portion that holds the biasing member capable of expanding and shrinking in its axial direction, between facing surfaces of the lower housing and a top wall part of the upper housing, and the lower housing is displaceable toward the top wall part in response to an elastic deformation of the biasing member, and is configured to be biased toward the plate material in response to elastic recovery of the biasing member.

The sensor unit further includes the upper housing that is open to the surface of the conductive path structure, and the lower housing that is inserted into the upper housing from the opening side of the upper housing and is displaceable in the axial direction of the upper housing. The lower housing includes, on the lower end side in the axial direction, the sensor element accommodation part that surrounds the sensor element and is fixed to the surface of the conductive path structure, and thus the lower housing can be protected from, for example, interference with another member of the sensor element. Also, by providing the biasing member between the upper housing and the lower housing, it is possible to bias the lower housing toward the plate material provided on the rear surface of the conductive path structure using elastic recovery of the biasing member. Therefore, for example, when the sensor unit is disposed above the detection target, the contact surface of the plate material can be reliably pressed against the detection target due to elastic recovery of the biasing member. As a result, the pressed state can be maintained. As a result, it is possible to provide the sensor unit that can realize reliable detection of the sensor element, with a downsized configuration in which the upper housing and the lower housing are coaxially arranged.

(5) Preferably the biasing member holding portion of the lower housing on the upper end side in the axial direction has a diameter larger than the sensor element accommodation part on the lower end side in the axial direction, and a stepped surface is provided between the biasing member holding portion and the sensor element accommodation part, the upper housing has a pair of elastic locking pieces that protrude downward in the axial direction from the top wall part while facing an outer peripheral surface of the lower housing, and are deflectable and deformable outward in a radial direction, the pair of elastic locking pieces being provided with, at lower ends thereof, a locking projection that protrudes inward, and the lower housing accommodated between the pair of elastic locking pieces of the upper housing is displaceable toward the top wall part of the upper housing in response to an elastic deformation of the biasing member, and is biased toward the plate material in response to elastic recovery of the biasing member, and a displacement end of the lower housing on the plate material side is defined by the stepped surface of the lower housing being locked to the locking projections of the pair of elastic locking pieces.

When the diameter of the lower housing is larger on the upper side in the axial direction (biasing member holding portion) than on the lower side in the axial direction (sensor element accommodation part), the stepped surface can be formed that extends over the entire periphery of the lower housing. Also, only with the pair of elastic locking pieces holding the lower housing protruding from the top wall part, it is possible to easily realize a configuration in which the lower housing is assembled to the upper housing in the axial direction in a suitable manner. When the radial dimension between the locking projections of the pair of elastic locking pieces is smaller than the radial dimension of the biasing member holding portion of the lower housing, it is possible to easily realize a configuration in which the locking projections of the pair of elastic locking pieces are locked to the stepped surface. Since the pair of elastic locking pieces are deflectable and deformable outward in the radial direction, when inserting the biasing member holding portion of the lower housing from the lower end side (locking protrusion side) of the pair of elastic locking pieces, the biasing member holding portion of the lower housing is allowed to be inserted toward the top wall part of the upper housing due to the deflection and deformation of the pair of elastic locking pieces outward in the radial direction. Then, when the engagement projection sliding over the outer circumferential surface of the lower housing moves beyond the stepped surface of the lower housing, the pair of elastic locking pieces elastically recover inward in the radial direction, and the locking projections are locked to the stepped surface of the lower housing. With this, a displacement end of the lower housing to the plate material side is defined, and the lower housing is mounted and held in a state in which it is displaceable with respect to the upper housing in the axial direction. By employing such a structure, it is possible to provide the sensor unit that can reliably press and hold the contact surface of the plate material against a detection target.

(6) A sensor unit-equipped battery wiring module according to the present disclosure is a sensor unit-equipped battery wiring module configured to be mounted on a battery cell group in which a plurality of battery cells are lined up, the sensor unit-equipped battery wiring module including: a plurality of busbars electrically connected to the battery cell group; an insulating case in which the plurality of busbars are received; and a cover part that is mounted on the case and covers the plurality of busbars, wherein the sensor unit according to any one of the above-described items (1) to (5) is used as a sensor unit, the case includes a sensor unit arrangement region that is arranged on at least one battery cell that is a detection target, and in the sensor unit arrangement region, the sensor unit is arranged in a state in which the plate material is accessible to the battery cell.

With this configuration, the battery wiring module to be mounted to the cell group that is a detection target is configured as a sensor unit-equipped battery wiring module provided with the sensor unit. Also, the case of the battery wiring module includes a sensor unit arrangement region to be arranged on a battery cell that is a detection target, and the sensor unit is arranged in the sensor unit arrangement region in a state in which the plate material of the sensor unit is accessible to the battery cell. With this, just by assembling the sensor unit-equipped battery wiring module to the battery cell group from above, it is possible to bring the contact surface of the plate material of the sensor unit into contact with the battery cell that is a detection target. Moreover, a plate material obtained by folding the planar metal plate in half so that the portion in which a burr is formed is arranged on the inner side in the folding direction is used as the plate material of the sensor unit, making it possible to suppress a breakage of the conductive path structure and a reduction in detection accuracy, while simplifying the manufacturing process and reducing the manufacturing cost.

(7) Preferably, the sensor unit according to the above-described item (4) or (5) is used as the sensor unit, and the sensor unit is arranged in the sensor unit arrangement region in a state in which the upper housing is open to the battery cell, the upper housing being formed in one piece with the case. By arranging the sensor unit in the sensor unit arrangement region in a state in which the upper housing is oriented so as to be open to the battery cell, it is possible to realize reliable biasing of the plate material toward the battery cell using the biasing structure with the upper housing, the lower housing, and the biasing member. Moreover, since the upper housing is formed in one piece with the case, it is possible to improve the handling of the sensor unit-equipped battery wiring module and reduce the number of members. As a result, the workability of assembling the sensor unit-equipped battery wiring module to the battery pack can be improved.

Detail of Embodiment of Present Disclosure

The following will describe specific examples of the sensor unit and the sensor unit-equipped battery wiring module of the present disclosure with reference to the drawings. Note that the present disclosure is not limited to these examples, but rather is indicated by the scope of claims and is intended to include all modifications within a meaning and scope equivalent to the scope of claims.

Embodiment 1

A sensor unit-equipped battery wiring module 12 equipped with a sensor unit 10 according to Embodiment 1 of the present disclosure will be described with reference to FIGS. 1 to 9. The sensor unit-equipped battery wiring module 12 is mounted to a battery cell group 16 in which a plurality of battery cells 14 are lined up. Note that the sensor unit-equipped battery wiring module 12 can be arranged in any orientation, but the following description will be given using an up-down direction, a left-right direction, and a front-rear direction that are based on the up-down direction, the left-right direction, and the front-rear direction shown in the drawings. Also, when multiple members are the same, reference numerals may be given to some of the members and not to the other members.

Battery Cell Group 16

The battery cell group 16 includes the plurality of battery cells 14 lined up in a line. Note that in FIG. 1, the battery cell group 16 includes twelve battery cells 14 by way of example, but the number of battery cells 14 included in the battery cell group 16 is not limited to this. Also, the battery cell group 16 may include a plurality battery cells 14 lined up in a plurality of lines.

The plurality of battery cells 14 are lined up along a predetermined direction in a battery case 18. More specifically, the battery cells 14 each have an electrode forming surface from which a pair of positive electrode terminal 20*a* and negative electrode terminal 20*b* constituting an electrode terminal 20 protrude. Hereinafter, the electrode forming surface may be referred to as an upper surface of the corresponding battery cell 14. The plurality of battery cells 14 are lined up in the battery case 18 with the electrode forming surfaces thereof directed upward. Furthermore, the plurality of battery cells 14 are lined up such that the positive electrode terminals 20*a* and the negative electrode terminals 20*b* of adjacent battery cells 14 are alternately placed.

A not shown separator made of a resin or the like is disposed between adjacent battery cells 14, and the plurality of battery cells 14 are lined up in the battery case 18 with small gaps therebetween so that their side surfaces do not come into close contact with each other. Due to small gaps formed between adjacent battery cells 14, at least heat dissipation properties of the battery cells 14 can be ensured.

The sensor unit-equipped battery wiring module 12 is mounted on the battery cell group 16 to connect the battery cells 14 in parallel to each other. The sensor unit-equipped battery wiring module 12 is attached to terminal rows 20*c*.

Sensor Unit-Equipped Battery Wiring Module 12

As shown in FIG. 1, the sensor unit-equipped battery wiring module 12 according to Embodiment 1 of the present disclosure includes a plurality of busbars 22 that each electrically connect adjacent battery cells 14 to each other, among the plurality of battery cells 14 lined up in a line. Also, the sensor unit-equipped battery wiring module 12 includes: insulating cases 26 with a busbar receiving frame 24 that receives the plurality of busbars 22; cover parts 28 that are respectively fitted to the cases 26 and cover the plurality of busbars 22; and a sensor unit 10.

Busbar 22

The busbars 22 electrically connect the negative electrode terminal 20*b* of the rear-most battery cell 14 and the positive electrode terminal 20*a* of the front-most battery cell 14. Also, each busbar 22 electrically connects a positive electrode 20*a* and a negative electrode terminal 20*b* that are adjacent to each other. With this, the plurality of battery cells 14 are connected in series to each other.

Each busbar 22 is a conductor, for example, a plate-shaped member made of copper, and has through holes 30 in a central portion. By inserting not-shown bolts into the through holes 30 and fastening the bolts, the busbar 22 can be fixed to and electrically connected to the positive electrode terminal 20*a* and/or the negative electrode terminal 20*b*.

Case 26

The cases 26 are, for example, insulating plate members made of a synthetic resin, and each have, on both sides in a width direction (left-right direction), a plurality of holes into which a positive electrode terminal 20*a* and a negative electrode terminal 20*b* of the battery cell group 16 are respectively inserted. The size of the case 26 corresponds to the surfaces of the battery cell group 16 from which the positive electrode terminals 20*a* or the negative electrode terminals 20*b* protrude. The busbar receiving frame 24 of the case 26 is a groove whose cross-section is U-shaped, and the busbars 22 are received in the groove and are placed at the bottom.

Also, a conductive path structure routing route 34 in which a conductive path structure 32 is routed (see FIG. 4) is provided on the inner side of the busbar receiving frame 24 of the case 26 in a width direction (left-right direction). The conductive path structure routing route 34 has the shape of, for example, a tube extending in the longitudinal direction, so that the conductive path structure 32 is routed inside the conductive path structure routing route 34. In addition, the case 26 includes a sensor unit arrangement region A to be arranged on a single battery cell 14 (in the present embodiment, the front-most battery cell 14), which is a detection target (see FIGS. 2 and 4).

Cover Part 28

The cover parts 28 are insulating planar plate members made of synthetic resin. Each cover part 28 has, at the outer periphery thereof, a plurality of engagement parts 36 extending downward, and the cover part 28 is fixed and attached to the corresponding case 26 when the engagement parts 36 engage with corresponding engaged parts 38 provided on the case 26 (see FIG. 1).

Sensor Unit 10

The sensor unit 10 is a unit that is placed onto a single battery cell 14, which serves as a detection target, from above. The sensor unit 10 includes the band-shaped and flexible conductive path structure 32, a sensor element 40 connected to an end of the conductive path structure 32, and a plate material 42 attached to the conductive path structure 32.

Conductive Path Structure 32

Figure 3:
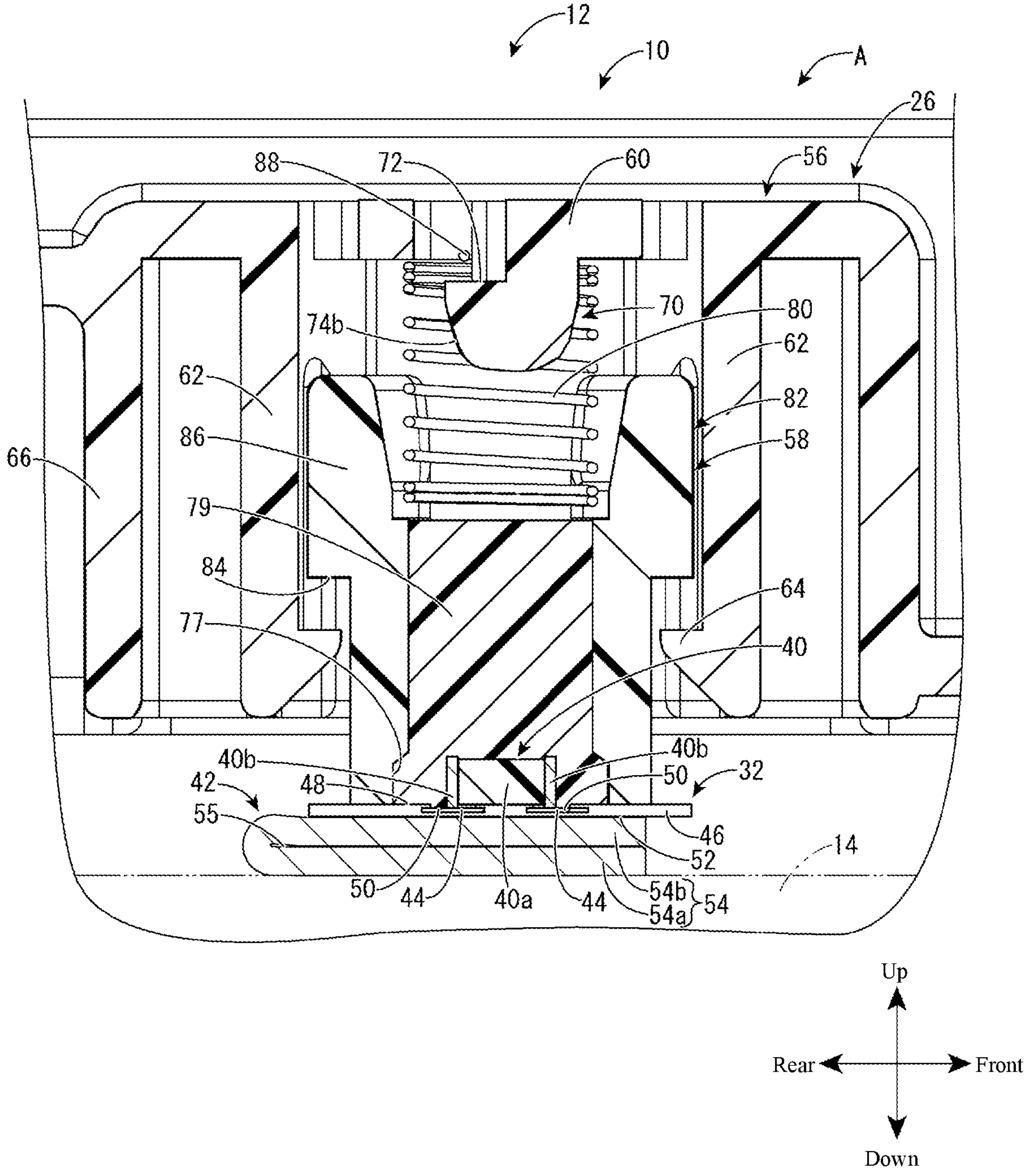
FIG. 3 is an enlarged cross-sectional view illustrating the main part taken along a line III-III in FIG. 2.
Figure 4:
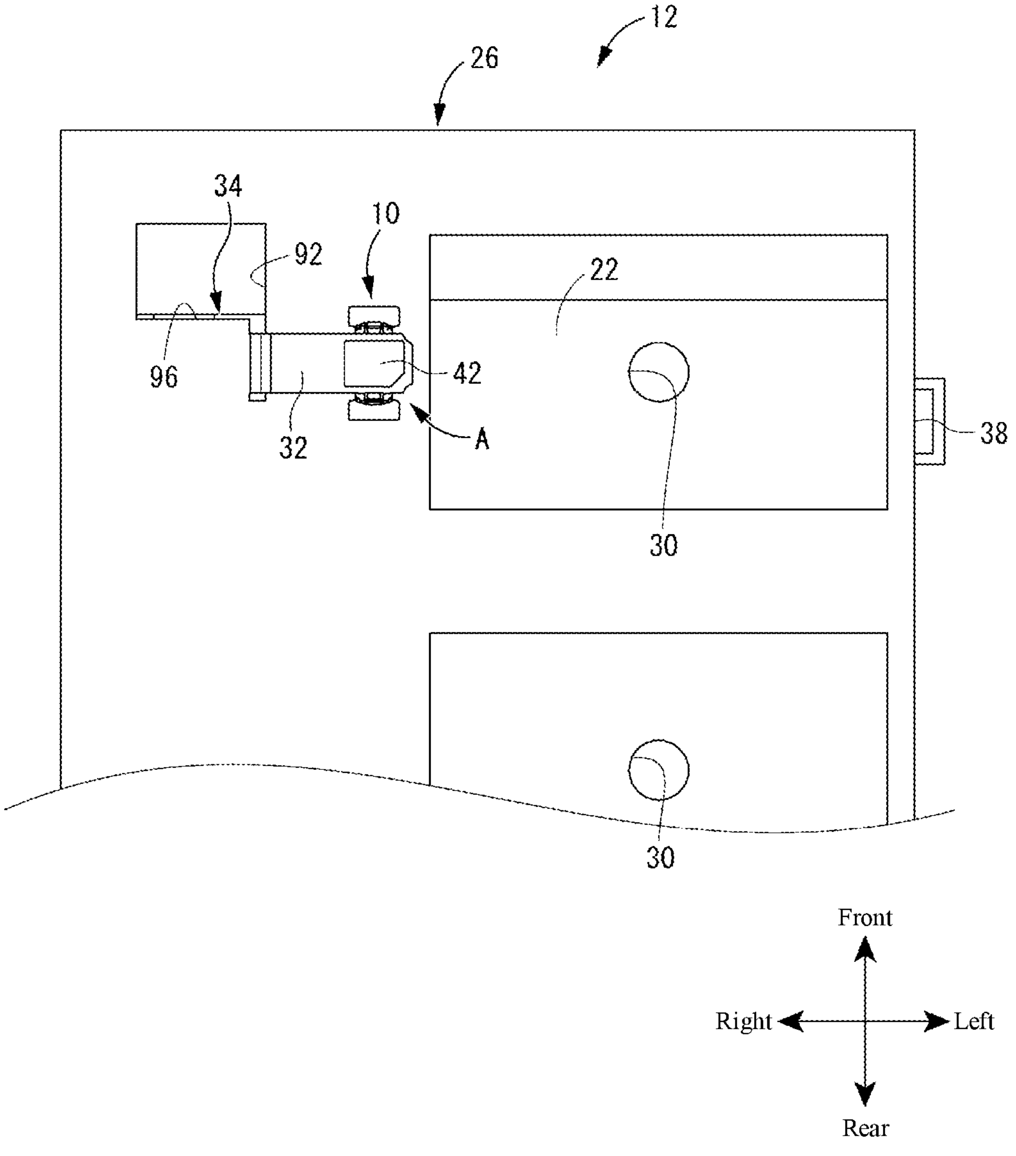
FIG. 4 is a bottom view illustrating the sensor unit-equipped battery wiring module shown in FIG. 2.
Figure 6:
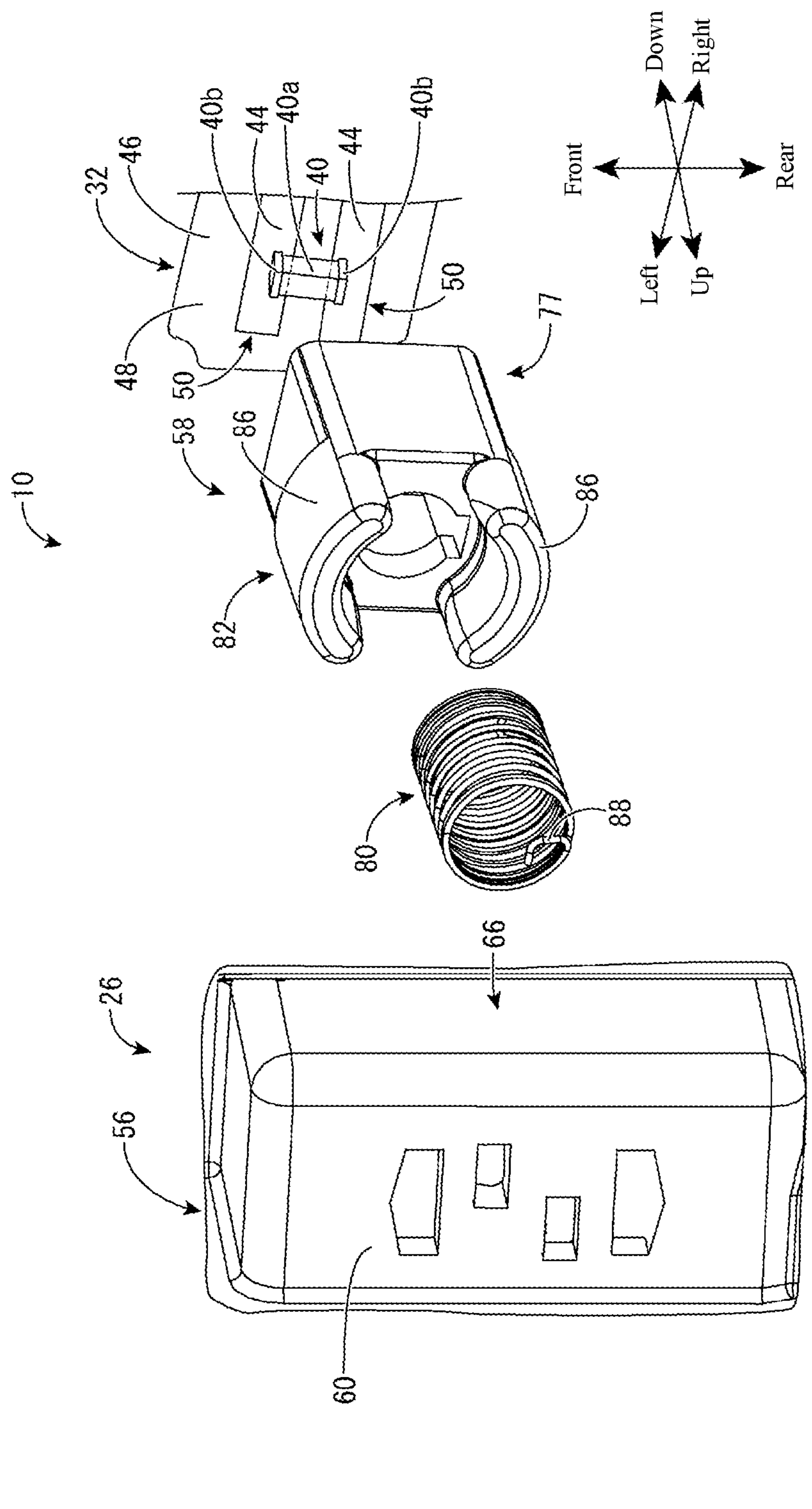
FIG. 6 is an exploded perspective view illustrating a sensor unit shown in FIG. 5.

As shown in FIGS. 3 and 6, the conductive path structure 32 is formed by covering a pair of laminated conductors 44 made of, e.g., copper foil with a band-shaped insulating film 46, which is wider than the pair of conductors 44. Accordingly, the conductive path structure 32 has a higher flexibility than covered wires and a highly space-saving configuration. A pair of connection parts 50 from which the pair of conductors 44 are exposed are formed on a surface 48, which is an upper surface at one end of the conductive path structure 32. The pair of connection parts 50 are formed by removing the insulating film 46. The other end of the conductive path structure 32 is connected to a not-shown control unit that controls the battery cell group 16.

Sensor Element 40

As shown in FIGS. 3 and 6, the sensor element 40 includes a sensor body 40*a* that is substantially rectangular. A pair of soldered parts 40*b* are provided at both ends of the sensor body 40*a*. The pair of soldered parts 40*b* are electrically connected to the pair of conductors 44 by being connected to the pair of connection parts 50 provided at the end of the conductive path structure 32 with solder or the like. Accordingly, a configuration is such that a detection signal from the sensor element 40 arranged on the surface 48 of the conductive path structure 32 is input to the control unit via the pair of conductors 44 of the conductive path structure 32. Note that any sensor such as a temperature sensor or a pressure sensor can be used as the sensor element 40. In the present embodiment, the sensor element 40 is a temperature sensor, but is not limited to this.

Plate Material 42

As shown in FIG. 3, the plate material 42 is formed as a planar plate with a high flatness. The plate material 42 is arranged on a rear surface 52 of the conductive path structure 32, and the upper surface, which is one surface, of the plate material 42 is fixed, by bonding or crimping, to a portion of the conductive path structure 32 that is opposite to the sensor element 40 in the thickness direction of the conductive path structure 32. The plate material 42 is configured by a metal plate material that is made of an aluminum, an aluminum alloy copper, a copper alloy or the like, and is excellent in heat transmission. The lower surface, which is the other surface, of the plate material 42 serves as a contact surface for contacting a single battery cell 14, which is a detection target. The plate material 42 has a shape obtained by folding a single planar metal plate 54 in a plate thickness direction in half, and has a first planar plate portion 54*a* and a second planar plate portion 54*b* that are overlapped with each other in the folding direction. The folded portion is less flat, and thus the plate material 42 is fixed to the conductive path structure 32 in the portion excluding the folded portion. A burr may be formed on a cut surface (side surface) of the single planar metal plate 54 at an end in a shear direction. That is to say, the portion in which a burr is formed is limited to one end of a cut surface (side surface) of the plate material. Therefore, the arrangement is such that a portion in which a burr is formed is arranged on the inner side in the folding direction. Furthermore, a gap between the overlapping surfaces of the first planar plate portion 54*a* and the second planar plate portion 54*b* is filled with a thermally conductive resin 55.

With this, even if a gap is created between the first planar plate portion 54*a* and the second planar plate portion 54*b*, it is possible to suppress a reduction in heat conductivity between the first planar plate portion 54*a* and the second planar plate portion 54*b* via the thermally conductive resin 55 whose thermal conductivity is greater than that of an air layer. Note that a configuration is also possible in which the overlapping surfaces of the first planar plate portion 54*a* and the second planar plate portion 54*b* are in intimate contact with each other, and the thermally conductive resin 55 does not need to be provided. Here, as the thermally conductive resin 55, specifically, a silicone resin, a non-silicone acrylic resin or ceramic resin, or the like can be used. More specifically, examples of the material of the thermally conductive resin 55 include a heat dissipation gap filler, a heat conductive grease, a heat conductive silicone rubber, and the like that are made a silicone resin. Also, the thermally conductive resin 55 may be sheet-shaped and elastically deformable, so that the thickness thereof changes according to the force applied in the up-down direction.

As shown in FIGS. 2 to 3 and 5 to 7, the sensor unit 10 includes: an upper housing 56 in the shape of a bottomed tube that is open downward; and a tubular lower housing 58 that is open upward and downward. The sensor unit 10 is arranged in the sensor unit arrangement region A of the sensor unit-equipped battery wiring module 12. In the sensor unit arrangement region A, the sensor unit 10 is in a state in which the upper housing 56 is oriented so as to be open toward the battery cell 14, and the upper housing 56 is formed in one piece with the case 26 of the sensor unit-equipped battery wiring module 12.

Upper Housing 56

Figure 5:
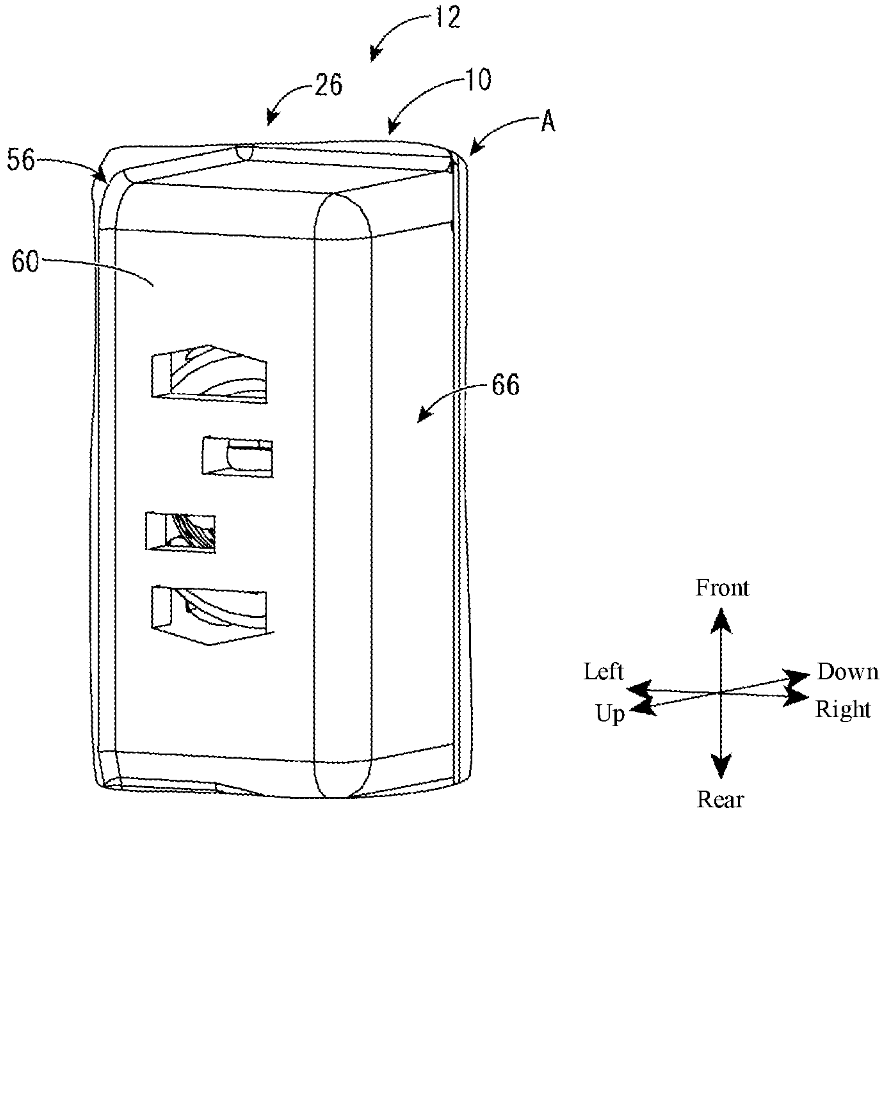
FIG. 5 is an enlarged perspective view illustrating a sensor unit arrangement region of the sensor unit-equipped battery wiring module shown in FIG. 1.
Figure 7:
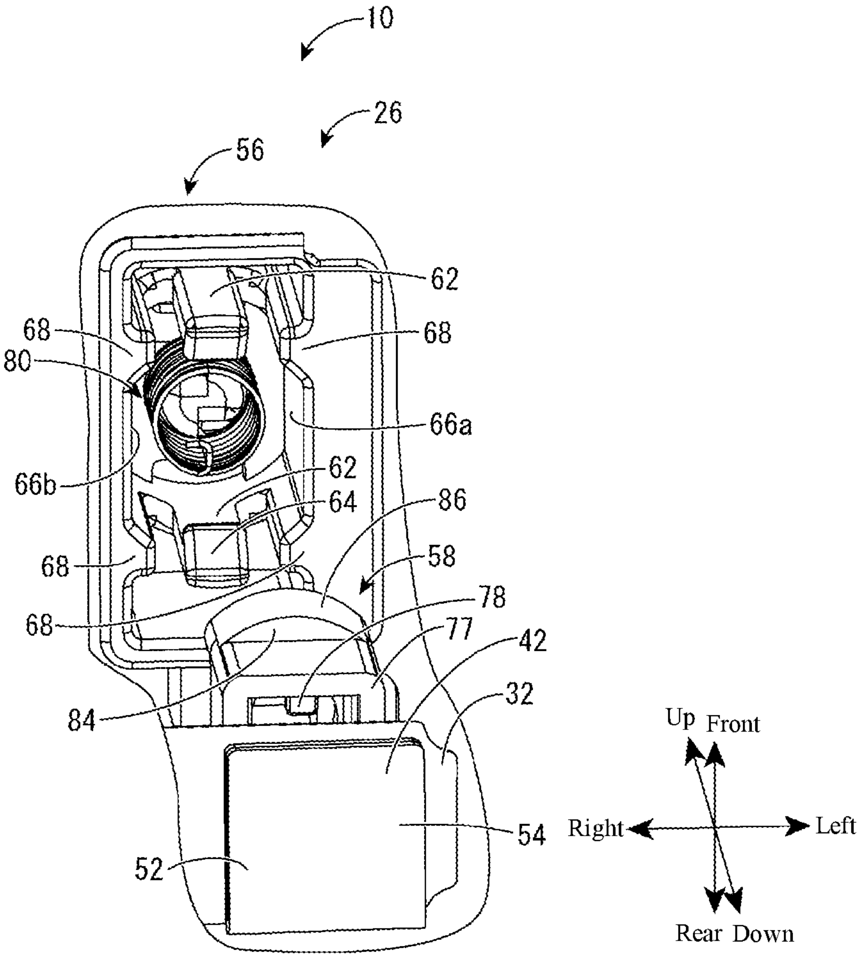
FIG. 7 is a diagram of the sensor unit shown in the exploded perspective view in FIG. 6, viewed from the bottom side.

As shown in FIG. 3, the upper housing 56 is arranged on the surface 48 of the conductive path structure 32, and is open toward the surface 48. Also, the upper housing 56 has a pair of elastic locking pieces 62 that protrude downward in the axial direction from a top wall part 60 while facing the outer peripheral surface of the lower housing 58, the pair of elastic locking pieces 62 being deflectable and deformable outward in a radial direction (left-right direction in FIG. 3). Each of the pair of elastic locking pieces 62 is provided with, at the lower end thereof, a locking projection 64 that projects inward and is square tubular with a substantially triangular cross-sectional shape. Furthermore, as shown in FIGS. 3, 5, and 7, a peripheral wall part 66 that protrudes from the periphery of the top wall part 60 of the upper housing 56 toward the surface 48 of the conductive path structure 32 surrounds the biasing member 80 over its entire length in the axial direction (see FIGS. 3 and 7). In addition, peripheral wall facing surfaces 66*a* and 66*b* of the peripheral wall part 66 that face each other in a short-side direction (left-right direction in FIG. 7) are provided with pairs of guide projections 68 that project toward each other and extend in the axial direction (up-down direction), the pairs of guide projections 68 being distanced from each other in the front-rear direction.

As shown in FIG. 3, the upper housing 56 has a positioning protrusion 70 that protrudes from the center of the top wall part 60 downward in the axial direction, that is, toward the upper housing 58, and is inserted into the other end (lower end) of the later-described biasing member 80 in the axial direction.

Positioning Protrusion 70

Figure 8:
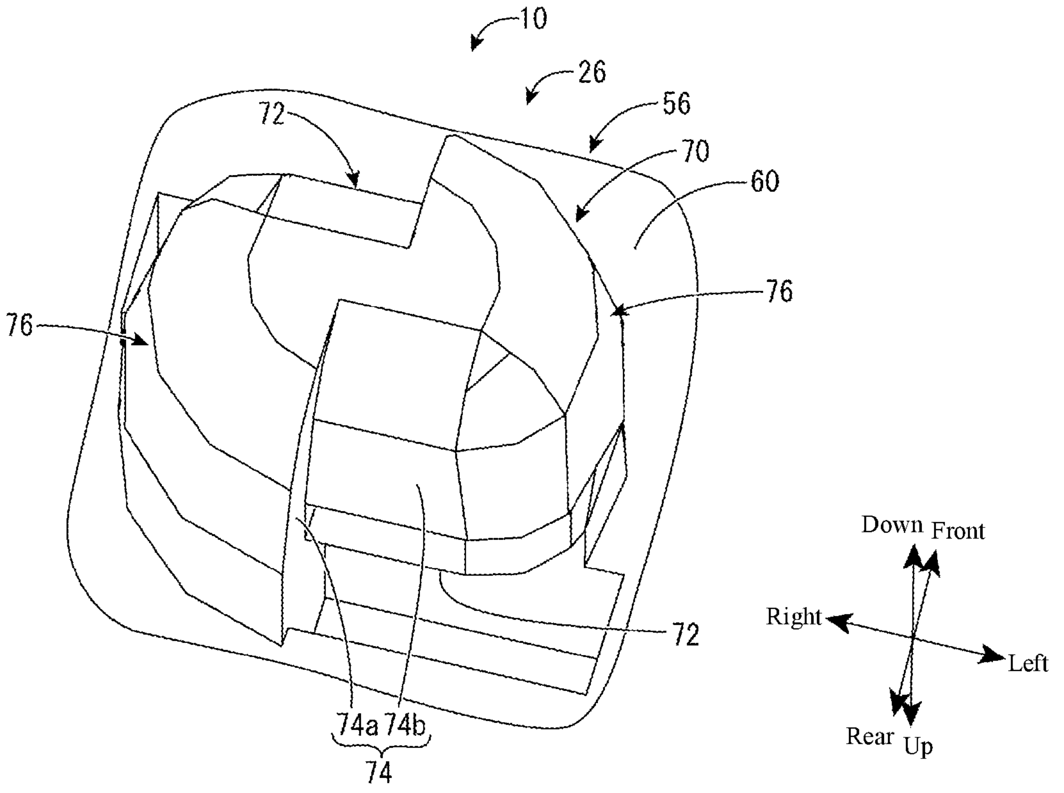
FIG. 8 is an enlarged perspective view of a positioning protrusion of an upper housing shown in FIG. 3, viewed from the bottom side.
Figure 9:
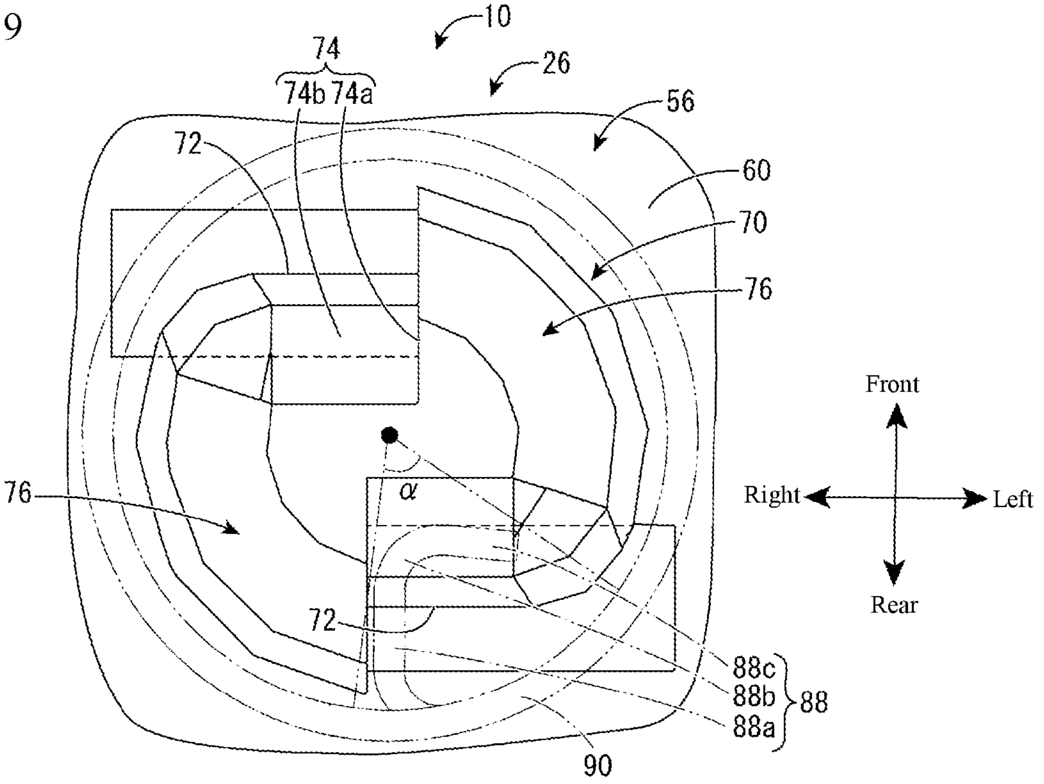
FIG. 9 is a bottom view of the upper housing shown in FIG. 8, illustrating the positioning protrusion and a biasing member in an enlarged view.

As shown in FIGS. 3, 8, and 9, the positioning protrusion 70 includes a pair of receiving recesses 72 that are open in the outer peripheral surface of the base portion and are recessed to the inner peripheral side. The receiving recesses 72, which are open in the outer peripheral surface of the positioning protrusion 70, are respectively provided at two positions distanced in the circumferential direction. The positioning protrusion 70 has, on the outer circumferential surface thereof, guide recesses 74 extending toward the respective receiving recesses 72 in the axial direction of the positioning protrusion 70, the guide recesses 74 being configured to position a later-described engaging protrusion 88 in the circumferential direction of the positioning protrusion 70. The guide recesses 74, which are open in the outer peripheral surfaces of the positioning protrusion 70 and extend toward a base end portion, are evenly distributed on the outer circumferential surface of the positioning protrusion 70 at two positions distanced from each other in the circumferential direction. The receiving recesses 72 are contiguous to the respective guide recesses 74 and are open in the outer circumferential surface of the positioning protrusion 70. The positioning protrusion 70 has, at two positions distanced from each other in the circumferential direction, two arc-shaped outer circumferential surface portions 76, which are protrusions from the outer circumferential surface, and the guide recesses 74 of the positioning protrusion 70 adjacent in the circumferential direction are contiguous to each other via the arc-shaped outer circumferential surface portions 76 arranged therebetween. Each guide recess 74 has a first guide surface 74*a* and a second guide surface 74*b* against which a proximal portion 88*a* and a distal portion 88*c* of the later-described engagement projection 88 respectively abut, and that extend orthogonal to each other. The first guide surface 74*a* is a flat surface that extends in the up-down direction, which is the axial direction of the positioning protrusion 70, and in the direction orthogonal to the up-down direction. The second guide surface 74*b* extends toward the base end portion orthogonally to the first guide surface 74*a*, and has a protruding and curved shape of protruding outward in the axial direction.

That is to say, the second guide surface 74*b* extends toward the base end portion, while expanding in the radial direction of the later-described biasing member 80.

Lower Housing 58

As shown in FIG. 3, the lower housing 58 is mounted inside the upper housing 56 in a state in which it is displaceable in the axial direction of the upper housing 56. More specifically, the lower housing 58 on the lower end side in the axial direction surrounds the sensor element 40 in the shape of a hollow tube, and the lower end surface of the lower housing 58 is fixed to the surface 48 of the conductive path structure 32 with an adhesive or the like to constitute the sensor element accommodation part 77. The sensor element accommodation part 77 has, on its inner wall, a pair of retaining protrusions 78 protruding inward (see FIG. 7). A sealing material 79 for protecting the sensor element 40 from water, dust, and the like is injected into the sensor element accommodation part 77, and as a result of the sealing material 79 being hardened, the sealing material 79 is retained by the pair of retaining protrusions 78 while covering the sensor element 40. The lower housing 58 on the upper end side in the axial direction constitutes a support portion 82, serving as a biasing member holding portion, that holds the biasing member 80 capable of expanding and shrinking in the axial direction, between the facing surface of the lower housing 58 and the top wall part 60 of the upper housing 56. That is to say, the support portion 82 supports one end of the biasing member 80 in the axial direction. The biasing member 80 is a metal coil spring obtained by winding a metal wire material such as SUS in a spiral shape. Accordingly, the lower housing 58 is displaceable toward the positioning protrusion 70 of the top wall part 60 in response to an elastic deformation of the biasing member 80 that shrinks in the axial direction, and the lower housing 58 is biased toward the plate material 42, that is, the battery cell 14 in response to an elastic recovery of the biasing member 80. That is to say, the coil biasing member 80 biases the lower housing 58 toward the battery cell 14 that serves as a detection target. Also, the lower housing 58 is assembled to the upper housing 56 with the biasing member 80 interposed therebetween in the axial direction of the biasing member 80.

The support portion 82 of the lower housing 58 provided on its upper end side in the axial direction has a diameter larger than the sensor element accommodation part 77 provided on the lower end side in the axial direction, and a stepped surface 84 is provided between the support portion 82 and the sensor element accommodation part 77. The support portion 82 has cut-off portions in the circumferential wall 86 that face each other in the left-right direction, and are cut off over the entire length in the up-down direction.

Biasing Member 80

As shown in FIGS. 3, 6, and 9, the upper end portion, which is the other end portion, of the biasing member 80 has the engagement projection 88 that projects from a terminal of the bar wire of the biasing member 80 to the inner circumferential side of the biasing member 80 and is deflectable and deformable inward in the axial direction of the biasing member 80. The engagement projection 88 has the proximal portion 88*a* extending to the inner circumferential side of the biasing member 80, a curved portion 88*b* that is contiguous to the proximal portion 88*a*, and the distal portion 88*c* that is contiguous to the curved portion 88*b* and extends toward the outer circumferential side of the biasing member 80 relative to the curved portion 88*b*. The proximal portion 88*a* and the distal portion 88*c* of the engagement projection 88 extend in the radial directions of the biasing member 80 that are orthogonal to each other, and the proximal portion 88*a* and the distal portion 88*c* protrude in an L-shape, when viewed in a plan view, from an arc-shaped portion 90 whose central angle $\alpha$ is 90° or less and that is included in the inner circumferential surface of the biasing member 80.

Method for Assembling Sensor Unit-Equipped Battery Wiring Module 12

The following will describe an overview of a method for assembling the sensor unit-equipped battery wiring module 12 according to Embodiment 1 of the present disclosure. First, the sensor element 40 is soldered to the pair of connection parts 50 provided on the surface 48 at an end of the conductive path structure 32. Then, the plate material 42 is fixed to the rear surface 52 at one end of the conductive path structure 32 at a position opposite to the sensor element 40. Then, the lower housing 58 surrounds the sensor element 40 and is fixed to the surface 48 at the end of the conductive path structure 32, and the sealing material 79 is injected into the sensor element accommodation part 77 and is hardened. Subsequently, the conductive path structure 32 is arranged on the conductive path structure routing route 34 provided on the surface side of the case 26. The other end of the conductive path structure 32 is connected to the connector 94, and the connector 94 is attached to the rear end of the conductive path structure routing route 34. Then, the biasing member 80 is pressed against the positioning protrusion 70 while being positioned such that the axis of the biasing member 80 is aligned with the axis of the positioning protrusion 70 of the upper housing 56 provided in the sensor unit arrangement region A. At this time, as a result of the proximal portion 88*a* and the distal portion 88*c* of the engagement projection 88 of the biasing member 80 respectively engaging with the first guide surface 74*a* and the second guide surface 74*b* of the guide recess 74 of the positioning protrusion 70, the engagement projection 88 and the biasing member 80 are positioned in the circumferential direction of the positioning protrusion 70. With this, the engagement projection 88 of the biasing member 80 is deflected and deformed inward in the axial direction of the biasing member 80, allowing the positioning protrusion 70 to be inserted into the biasing member 80. Then, the engagement projection 88 of the biasing member 80 is guided by the guide recess 74 and reaches the receiving recess 72. As a result, the engagement projection 88 elastically recovers, and is received and locked in the receiving recess 72, so that the biasing member 80 is held by the positioning protrusion 70.

Then, one end of the conductive path structure 32 is moved toward the rear surface of the case 26 through an opening 92 (see FIG. 4) and a slit 96 provided in the case 26. Then, the support portion 82 of the lower housing 58 is inserted between the pair of elastic locking pieces 62 of the upper housing 56 that is open to the surface of the case 26. With this, the pair of elastic locking pieces 62 are elastically deformed outward in the radial direction, and allow the support portion 82 to be inserted therebetween. After the insertion of the support portion 82, the pair of elastic locking pieces 62 elastically recover and the stepped surface 84 of the lower housing 58 is locked into the locking projection 64 of the pair of elastic locking pieces 62. That is to say a displacement end on the plate material 42 side is defined as a result of the stepped surface 84 of the lower housing 58 being locked to the locking projection 64 of the pair of elastic locking pieces 62.

Then, the case 26 having such a configuration is assembled to the battery cell group 16. As a result, as shown in FIG. 3, the plate material 42 is brought into contact with the surface of the battery cell 14 and the lower housing 58 is pressed upward, and thus the lower housing 58 is biased downward by the biasing member 80. That is to say, in the sensor unit arrangement region A, the sensor unit 10 is arranged in a state in which the plate material 42 is accessible to the battery cell 14, and the sensor unit 10 is pressed against the battery cell 14 by the biasing member 80. That is to say, the sensor unit 10 includes the biasing member 80 that biases the plate material 42 toward the battery cell 14 that is the detection target. Ultimately, the busbar 22 and the cover part 28 are attached to the case 26, and the sensor unit-equipped battery wiring module 12 is complete.

According to the sensor unit 10 of the present disclosure having the above-described configuration, the metal plate material 42 fixed to the rear surface 52 of the conductive path structure 32 has a shape obtained by folding a single planar metal plate 54 in a plate thickness direction in half. With this, a portion in which a burr is formed is arranged on the inner side in the folding direction. That is to say, the inventors and the like of the present application focused on the fact that a portion in which a burr is formed is limited to one end of a cut surface (side surface) of a single planar metal plate 54, and employed the plate material 42 having a shape obtained by folding a single planar metal plate 54 in a plate thickness direction in half, so that the portion in which a burr is formed is arranged on the inner side in the folding direction. With this, even if the planar metal plate 54 constituting the plate material 42 has a burr, the burr will be arranged on the inner side in the folding direction. This prevents such a situation that a burr is arranged on one surface side on which the plate material 42 is fixed to the rear surface 52 of the conductive path structure 32, or on the other surface side on which the plate material 42 comes into contact with the battery cell 14 that is a detection target. Accordingly, even if the metal plate material 42 is employed, such situations are suppressed that a burr comes into contact with the conductive path structure 32 to break the conductive path structure 32, or a gap or backlash is created between the battery cell 14 that is a detection target, and the plate material 42 due to a burr to reduce the detection accuracy of the sensor element 40. Moreover, since a deburring process, which was needed for a conventional plate material, is no longer required, it is possible to simplify the manufacturing process and reduce the manufacturing cost. Particularly, in the present embodiment, since the sensor element 40 is a temperature sensor, the heat collecting effects of the plate material 42 can be used to stabilize the detection of the sensor element 40.

The sensor unit 10 further includes: an upper housing 56 that is open to the surface 48 of the conductive path structure 32; and a lower housing 58 that is inserted into the upper housing 56 from the opening side of the upper housing 56 and is displaceable in the axial direction of the upper housing 56. The lower housing 58 includes, on the lower end side in the axial direction, the sensor element accommodation part 77 that surrounds the sensor element 40 and is fixed to the surface 48 of the conductive path structure 32, and thus the lower housing 58 can be protected from, for example, interference with another member of the sensor element 40. Also, by providing the biasing member 80 between the upper housing 56 and the lower housing 58, it is possible to bias the lower housing 58 toward the plate material 42 provided on the rear surface 52 of the conductive path structure 32. Therefore, for example, when the sensor unit 10 is disposed above the battery cell 14 that is a detection target, the plate material 42 can be held in a state in which the contact surface to the battery cell 14 is reliably pressed against the battery cell 14 due to elastic recovery of the biasing member 80. As a result, it is possible to provide the sensor unit 10 that can realize reliable detection of the sensor element 40, with a downsized configuration in which the upper housing 56 and the lower housing 58 are coaxially arranged.

When the diameter of the lower housing 58 is larger in the support portion 82 on the upper side in the axial direction than in the sensor element accommodation part 77 on the lower side in the axial direction, the stepped surface 84 of the lower housing 58 can be formed over the entire periphery thereof. Also, only with the pair of elastic locking pieces 62 holding the lower housing 58 protruding from the top wall part 60 of the upper housing 56, it is possible to easily realize a configuration in which the lower housing 58 is assembled to the upper housing 56 in the axial direction in a suitable manner. More specifically, the radial dimension between the locking projections 64 of the pair of elastic locking pieces 62 is smaller than the radial dimension of the support portion 82 of the lower housing 58. With this, when inserting the support portion 82 of the lower housing 58 from the lower end side (locking projection 64 side) of the pair of elastic locking pieces 62, the support portion 82 is allowed to be inserted into the upper housing 56 toward the top wall part 60 due to the deflection and deformation of the pair of elastic locking pieces 62 outward in the radial direction. Then, when the engagement projection 64 sliding over the outer circumferential surface of the lower housing 58 moves beyond the stepped surface 84 of the lower housing 58, the pair of elastic locking pieces 62 elastically recover inward in the radial direction, and the locking projections 64 are locked to the stepped surface 84 of the lower housing 64. With this, a displacement end of the lower housing 58 on the plate material 42 side is defined, and the lower housing 58 is mounted and held in a state in which it is displaceable with respect to the top wall part 60 of the upper housing 56 in the axial direction. By employing such a structure, it is possible to provide the sensor unit 10 that can reliably press and hold the contact surface of the plate material 42 against the battery cell 14 that is a detection target.

The battery wiring module to be mounted to the cell group 16 that is a detection target is configured as a sensor unit-equipped battery wiring module 12 provided with the sensor unit 10. The case 26 of the sensor unit-equipped battery wiring module 12 includes a sensor unit arrangement region A that is arranged on the battery cell 14 that is a detection target. In the sensor unit arrangement region A, the sensor unit 10 is arranged in a state in which the plate material 42 of the sensor unit 10 is accessible to the battery cell 14. With this, just by assembling the sensor unit-equipped battery wiring module 12 to the battery cell group 16 from above, it is possible to bring the contact surface of the plate material 42 of the sensor unit 10 into contact with the battery cell 14 that is a detection target. Moreover, a plate material obtained by folding the planar metal plate 54 in half so that the portion in which a burr is formed is arranged on the inner side in the folding direction is used as the plate material 42 of the sensor unit 10. Therefore, it is possible to suppress a breakage of the conductive path structure 32 and a reduction in detection accuracy of the sensor element 40, while simplifying the manufacturing process and reducing the manufacturing cost.

The upper housing 56 is arranged in the sensor unit arrangement region A so as to be open to the battery cell 14. With this, it is possible to realize reliable biasing of the plate material 42 toward the battery cell 14 using the biasing structure with the upper housing 56, the lower housing 58, and the biasing member 80. Moreover, since the upper housing 56 is formed in one piece with the case 26, it is possible to improve the handling of the sensor unit-equipped battery wiring module 12 and reduce the number of members. Accordingly the workability of assembling the sensor unit-equipped battery wiring module 12 to the battery cell group 16 can be improved.

OTHER EMBODIMENTS

The technology described herein is not limited to the embodiments described above and illustrated in the drawings, and for example, the following embodiments are also included in the technical scope of the technology described herein.

Figure 10:
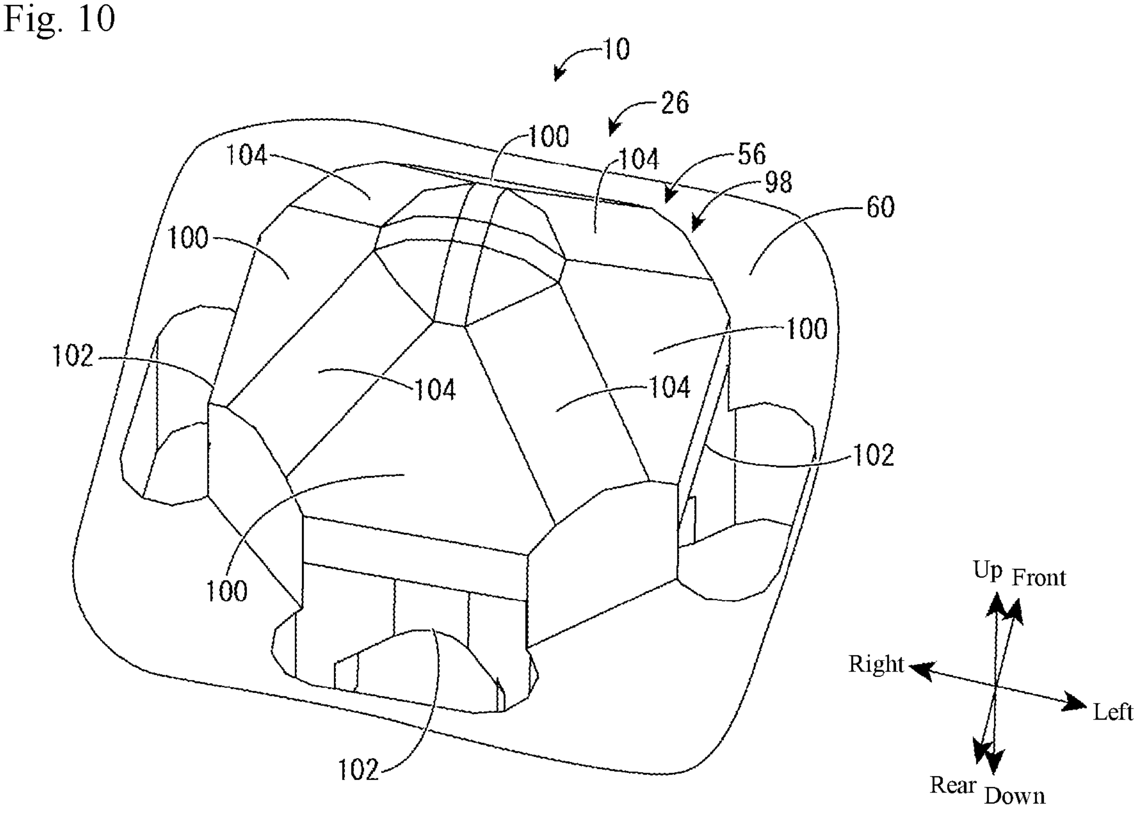
FIG. 10 is an enlarged perspective view illustrating a positioning protrusion of a sensor unit according to Embodiment 2, corresponding to FIG. 8.
Figure 11:
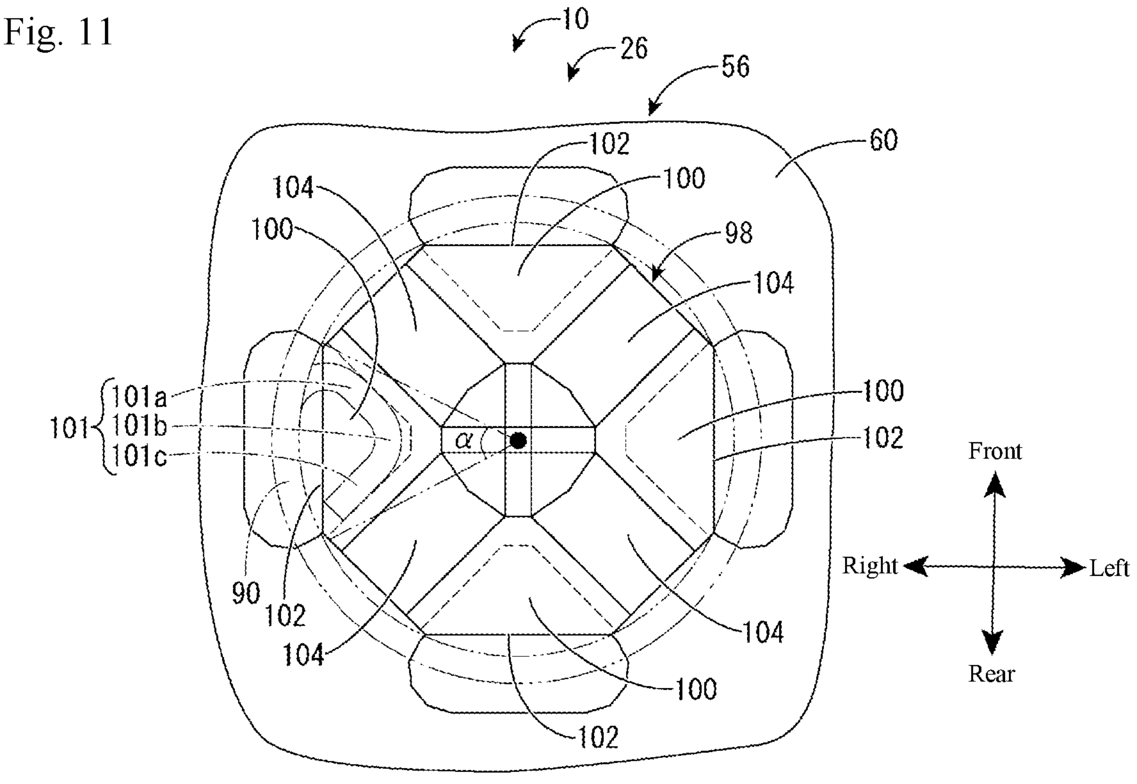
FIG. 11 is a bottom view of an upper housing shown in FIG. 10, corresponding to FIG. 9.

(1) In Embodiment 1 above, the engagement projection 88 of the biasing member 80 protrudes in an L-shape, when viewed in a plan view, from an arc-shaped portion 90 whose central angle α is 90° or less, and the guide recesses 74 of the positioning protrusion 70 are evenly distributed at two positions distanced from each other in the circumferential direction, but the present invention is not limited to this. As the positioning protrusion 98 of Embodiment 2 of the present disclosure shown in FIGS. 10 and 11, a proximal portion 101*a* and a distal portion 101*c* of an engagement projection 101 may extend while being inclined with respect to the radial direction of the biasing member 80, and the proximal portion 101*a* and the distal portion 101*c* may project in a V-shape, when viewed in a plan view, from the arc-shaped portion 90 whose central angle is 90° or less and that is included in the inner circumferential surface of the biasing member 80. Similar to Embodiment 1, the engagement projection 101 has the proximal portion 101*a* extending from a terminal of the bar wire of the biasing member 80 to the inner circumferential side of the biasing member 80, a curved portion 101*b* that is contiguous to the proximal portion 101*a*, and the distal portion 101*c* that is contiguous to the curved portion 101*b* and extends toward the outer circumferential side of the biasing member 80 relative to the curved portion 101*b*. Specifically, on the outer circumferential surface of the positioning protrusion 98, the guide surfaces 100 in a flat surface shape extending while being gradually widened toward the base end portion are evenly distributed on the outer circumferential surface of the positioning protrusion 98 at four positions distanced from each other in the circumferential direction. The base end portion of the positioning protrusion 98 is provided with four locking recesses 102 that are continuous with the guide surfaces 100 and are open, the four locking recesses 102 being provided at four positions in the circumferential direction that correspond to the guide surfaces 100. Furthermore, the positioning protrusion 98 has, at four positions distanced from each other in the circumferential direction, four arc-shaped outer circumferential surface portions 104, which are protrusions from the outer circumferential surface, and the guide surfaces 100 of the positioning protrusion 98 adjacent in the circumferential direction are contiguous to each other via the arc-shaped outer circumferential surface portions 104 arranged therebetween.

Since the guide surfaces 100 can be provided at four positions of the positioning protrusion 98 distanced from each other in the circumferential direction, there are many directions in which the biasing member 80 can be assembled to the positioning protrusion 98, making it possible to improve the assembling workability. Also, the arc-shaped outer circumferential surface portions 104 are arranged in the respective gaps in the circumferential direction between the four flat-surface shaped guide surfaces 100 provided on the positioning protrusion 98. Therefore, even if the circumferential position of the engagement projection 101 is shifted from a guide surface, the engagement projection 88 abutting against an arc-shaped outer circumferential surface portion 104 is guided toward the guide surface 100, and the engagement projection 101 of the engagement projection 88 can be advantageously guided to the correct circumferential position, and can be reliably locked into the locking recess 102.

(2) In Embodiments 1 and 2, the descriptions have been given taking the metal coil spring obtained by winding a metal wire material in a spiral shape as an example of the biasing member 80, but the present invention is not limited to this. Any type of biasing member may be employed as the biasing member 80 as long as it can bias the plate material 42 toward a detection target, and the biasing member 80 may be made of a synthetic resin, or may be a member like a blade spring. Alternatively, the biasing member 80 may be a biasing member as disclosed in Patent Document 1.

(3) In Embodiments 1 and 2, the descriptions have been given taking a case where the biasing member 80 is provided as an example, but the present invention is not limited to this. The biasing member 80 may be omitted. For example, a mechanism in which by assembling the sensor unit-equipped battery wiring module to the battery cell group 16, the plate material 42 of the sensor unit is crimped to a detection target may be provided instead.

LIST OF REFERENCE NUMERALS

10 Sensor Unit (Embodiment 1)
12 Sensor Unit-Equipped Battery Wiring Module
14 Battery cell (detection target)
16 Battery cell group
18 Battery case
20 Electrode terminal
20*a* Positive electrode terminal
20*b* Negative electrode terminal
20*c* Terminal row
22 Busbar
24 Busbar receiving frame
26 Case
28 Cover part
30 Through hole
32 Conductive path structure
34 Conductive path structure routing route
36 Engagement part
38 Engaged part
40 Sensor element
40*a* Sensor body
40*b* Soldered part
42 Plate material
44 Conductor
46 Insulating film
48 Surface
50 Connection part
52 Rear surface
54 Planar metal plate
54*a* First planar plate portion
54*b* Second planar plate portion

55 Thermally conductive resin
56 Upper Housing
58 Lower Housing
60 Top wall part
62 Elastic locking piece
64 Locking protrusion
66 Peripheral wall part
66*a* Peripheral wall facing surface
66*b* Peripheral wall facing surface
68 Guide projection
70 Positioning protrusion
72 Receiving recess
74 Guide recess
74*a* First guide surface
74*b* Second guide surface
76 Arc-shaped outer circumferential surface portion
77 Sensor element accommodation part
78 Retaining protrusion
79 Sealing material
80 Biasing member
82 Support portion (biasing member holding portion)
84 Stepped surface
86 Peripheral wall
88 Engagement protrusion
88*a* Proximal portion
88*b* Curved portion
88*c* Distal portion
90 Arc portion
92 Opening
C1 Connector
96 Slit
98 Positioning protrusion
100 Guide surface
101 Engagement protrusion
101*a* Proximal portion
101*b* Curved portion
101*c* Distal portion
102 Locking recess
104 Arc-shaped outer circumferential surface portion
A Sensor unit arrangement region

The invention claimed is:

1. A sensor unit comprising:

a band-shaped and flexible conductive path structure including a laminated conductor and an insulating film that covers the conductor;

a sensor element that is arranged on a surface of the conductive path structure and is connected to the conductor; and a plate material that is arranged on a rear surface of the conductive path structure, and has one surface fixed to a position of the conductive path structure that is opposite to the sensor element in a thickness direction of the conductive path structure, wherein another surface of the plate material serves as a contact surface for contacting a detection target, and the plate material has a shape obtained by folding one planar metal plate in a plate thickness direction in half, so that a portion of the planar metal plate in which a burr is formed is arranged on an inner side in the folding direction.

2. The sensor unit according to claim 1, wherein the plate material has a first planar plate portion and a second planar plate portion that are overlapped with each other in the folding direction, and a gap between overlapped surfaces of the first planar plate portion and the second planar plate portion is filled with a thermally conductive resin.

3. The sensor unit according to claim 1, further comprising:

a biasing member configured to bias the plate material toward the detection target.

4. The sensor unit according to claim 3, further comprising:

an upper housing that is arranged on the surface of the conductive path structure, and has a shape of a bottomed tube that is open to the surface; and a lower housing that is tubular, and is mounted inside the upper housing so as to be displaceable in an axial direction of the upper housing, wherein a portion of the lower housing on a lower end side in its axial direction surrounds the sensor element and is fixed to the surface of the conductive path structure, so as to configure a sensor element accommodation part, and a portion of the lower housing on an upper end side in the axial direction configures a biasing member holding portion that holds the biasing member capable of expanding and shrinking in its axial direction, between facing surfaces of the lower housing and a top wall part of the upper housing, and the lower housing is displaceable toward the top wall part in response to an elastic deformation of the biasing member, and is configured to be biased toward the plate material in response to elastic recovery of the biasing member.

5. The sensor unit according to claim 4, wherein the biasing member holding portion of the lower housing on the upper end side in the axial direction has a diameter larger than the sensor element accommodation part on the lower end side in the axial direction, and a stepped surface is provided between the biasing member holding portion and the sensor element accommodation part, the upper housing has a pair of elastic locking pieces that protrude downward in the axial direction from the top wall part while facing an outer peripheral surface of the lower housing, and are deflectable and deformable outward in a radial direction, the pair of elastic locking pieces being provided with, at lower ends thereof, a locking projection that protrudes inward, and the lower housing accommodated between the pair of elastic locking pieces of the upper housing is displaceable toward the top wall part of the upper housing in response to an elastic deformation of the biasing member, and is biased toward the plate material in response to elastic recovery of the biasing member, and a displacement end of the lower housing on the plate material side is defined by the stepped surface of the lower housing being locked to the locking projections of the pair of elastic locking pieces.

6. A sensor unit-equipped battery wiring module configured to be mounted on a battery cell group in which a plurality of battery cells are lined up, the sensor unit-equipped battery wiring module comprising:

a plurality of busbars electrically connected to the battery cell group;

an insulating case in which the plurality of busbars are received; and a cover part that is mounted on the case and covers the plurality of busbars, wherein the sensor unit according to claim 4 is used as a sensor unit, the case includes a sensor unit arrangement region that is arranged on at least one battery cell that is a detection target, and in the sensor unit arrangement region, the sensor unit is arranged in a state in which the plate material is accessible to the battery cell.

7. The sensor unit-equipped battery wiring module according to claim 6, wherein the sensor unit is arranged in the sensor unit arrangement region in a state in which the upper housing is open to the battery cell, the upper housing being formed in one piece with the case.

* * * * *